United States Patent
Myoi et al.

(10) Patent No.: US 9,558,376 B2
(45) Date of Patent: Jan. 31, 2017

(54) ELECTRONIC DEVICE

(75) Inventors: Tomoki Myoi, Kanagawa (JP); Takeshi Katae, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 44 days.

(21) Appl. No.: 13/535,192

(22) Filed: Jun. 27, 2012

(65) Prior Publication Data

US 2013/0002582 A1     Jan. 3, 2013

(30) Foreign Application Priority Data

Jun. 28, 2011   (JP) ................................. 2011-142483

(51) Int. Cl.
     *G06F 21/84*     (2013.01)
     *G06F 3/0488*     (2013.01)
     *G06F 3/01*     (2006.01)

(52) U.S. Cl.
     CPC ............... *G06F 21/84* (2013.01); *G06F 3/016* (2013.01); *G06F 3/0488* (2013.01)

(58) Field of Classification Search
     CPC ........ G06F 21/84; G06F 3/016; G06F 3/0488; G06F 3/048; G06F 9/54; A61J 1/1418; A61J 2007/0418; A61J 7/02; A61J 2205/60; A61M 15/008; A61K 9/2009
See application file for complete search history.

(56) References Cited

U.S. PATENT DOCUMENTS

| | | | |
|---|---|---|---|
| 7,552,868 B1 * | 6/2009 | Block et al. | 235/379 |
| 2008/0229230 A1 * | 9/2008 | Grigoriev et al. | 715/780 |
| 2009/0051667 A1 * | 2/2009 | Park et al. | 345/173 |
| 2010/0231539 A1 * | 9/2010 | Cruz-Hernandez et al. | 345/173 |
| 2010/0231550 A1 * | 9/2010 | Cruz-Hernandez et al. | 345/174 |
| 2010/0270089 A1 * | 10/2010 | Kyung et al. | 178/18.04 |
| 2010/0298048 A1 * | 11/2010 | Yamazaki | 463/30 |
| 2011/0304558 A1 * | 12/2011 | Pasquero et al. | 345/173 |
| 2012/0182248 A1 * | 7/2012 | Kobayashi et al. | 345/173 |
| 2012/0256723 A1 * | 10/2012 | Grover | 340/5.8 |

FOREIGN PATENT DOCUMENTS

| | | |
|---|---|---|
| JP | 10-293644 A | 11/1998 |
| JP | 2001034396 A * | 2/2001 |
| JP | 2003-016502 A | 1/2003 |

OTHER PUBLICATIONS

An Office Action; "Notice of Reason for Rejection," issued by the Japanese Patent Office on Sep. 30, 2014, which corresponds to Japanese Patent Application No. 2011-142483 and is related to U.S. Appl. No. 13/535,192; with English language concise explanation.

\* cited by examiner

*Primary Examiner* — Nicholas Lee
*Assistant Examiner* — Richard Hong
(74) *Attorney, Agent, or Firm* — Studebaker & Brackett PC

(57) ABSTRACT

An electronic device includes a display unit configured to display characters, a contact detection unit configured to detect a contact, a tactile sensation providing unit configured to provide a tactile sensation to an object contacting the contact detection unit, and a control unit configured to control such that predetermined characters are displayed as turned characters on the display unit, wherein the control unit, when the contact detection unit detects the contact at a position corresponding to the turned characters displayed on the display unit, controls the tactile sensation providing unit such that a tactile sensation associated with the characters corresponding to the turned characters is provided to the object.

2 Claims, 2 Drawing Sheets

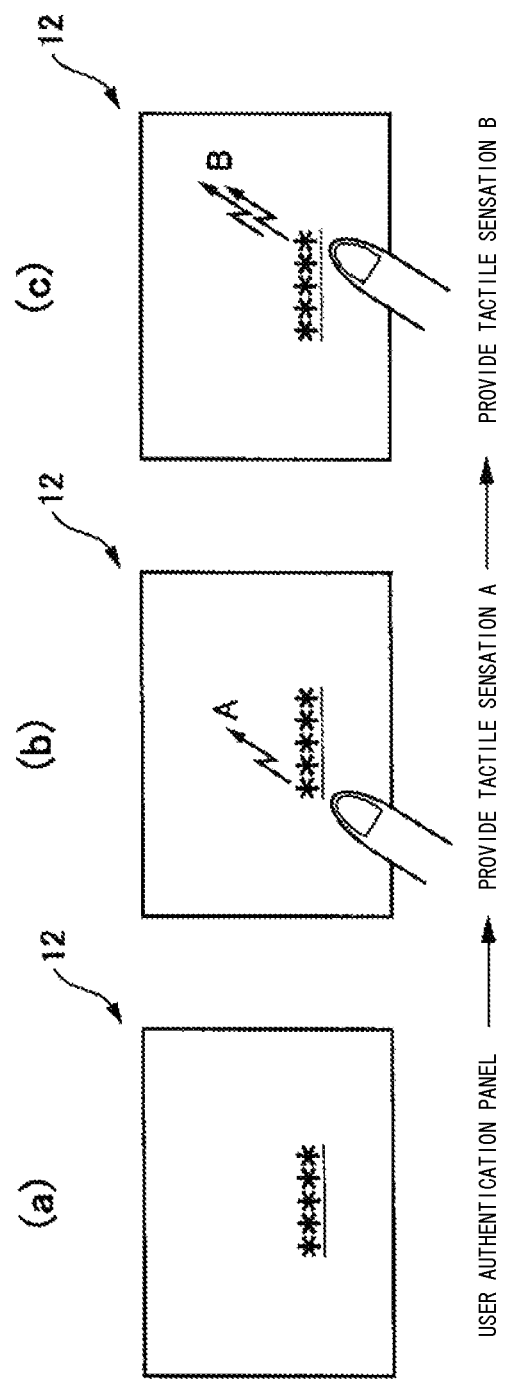

ELECTRONIC DEVICE

CROSS REFERENCE TO RELATED APPLICATION

This application claims priority to and the benefit of Japanese Patent Application No. 2011-142483 filed on Jun. 28, 2011, the entire contents of which are incorporated herein by reference.

FIELD

Embodiments discussed herein relate to an electronic device having a contact detection unit.

BACKGROUND

Lately, the electronic devices having the contact detection unit such as a touch sensor have been increasingly used for mobile terminals such as mobile phones. As a method to detect a contact by an operator, there are known variety of types, such as a resistive film type, a capacitive type, an optical type and the like. Those types detect the contact by a contact object such as an operator's finger, a stylus pen and the like.

As the electronic device having the contact detection unit, a touch panel having the contact detection unit and a display unit laminated to each other has been known. In the touch panel, the display unit is disposed on a rear face of the contact detection unit and displays graphical images of characters and images of buttons and the like (hereinafter, referred to as objects). When the operator presses the object displayed on the display unit, the contact detection unit detects a contact at a pushed position. A technique to provide a tactile sensation to the operator in response to pressing with a predetermined pressure load or higher has also been known.

Incidentally, some of the electronic devices display turned characters of authentication information input by the operator in user authentication. In this case, since the characters of the authentication information displayed are turned, the characters are not exposed to people around the operator and advantageous from a security standpoint. It has also been suggested to put a protective film on the display unit for preventing the characters of the authentication information from being exposed to people around the operator (for example, Japanese Patent Laid-Open No. 10-293644).

However, when the turned characters of the authentication information are displayed on the display unit, the operator himself/herself cannot read the characters, either. Therefore, it has been desired to provide an electronic device enabling the operator to confirm whether characters intended by the operator are acknowledged by a control unit.

SUMMARY

In one embodiment, an electronic device of the present embodiment includes a display unit configured to display characters, a contact detection unit configured to detect a contact, a tactile sensation providing unit configured to provide a tactile sensation to an object contacting the contact detection unit, and a control unit configured to control such that predetermined characters are displayed as turned characters on the display unit, wherein the control unit, when the contact detection unit detects the contact at a position corresponding to the turned characters displayed on the display unit, controls the tactile sensation providing unit such that a tactile sensation associated with the characters corresponding to the turned characters is provided to the object.

According to the present embodiment, the control unit, by controlling vibration amplitude of a drive signal for driving the tactile sensation providing unit, controls a magnitude of the tactile sensation provided to the object contacting the contact detection unit such that the vibration amplitude of the drive signal for controlling the tactile sensation providing unit to provide the object with a tactile sensation associated with the characters corresponding to the turned characters is smaller than the vibration amplitude of the drive signal for other operations.

BRIEF DESCRIPTION OF DRAWINGS

FIGS. 3(a)-3(c) are diagrams schematically illustrating the operation of the electronic device launched on a display panel according to the embodiment.

DESCRIPTION OF EMBODIMENTS

Embodiments will be described with reference to the accompanying drawings.

In order to solve the above mentioned problem, embodiments discussed herein provide an electronic device enabling only the operator to confirm characters of authentication information without exposing the characters to people around the operator.

According to one embodiment, the electronic device enabling only an operator to confirm characters of authentication information without exposing the characters to people around the operator may be provided.

(Configuration of the Embodiment)

Figure 1:
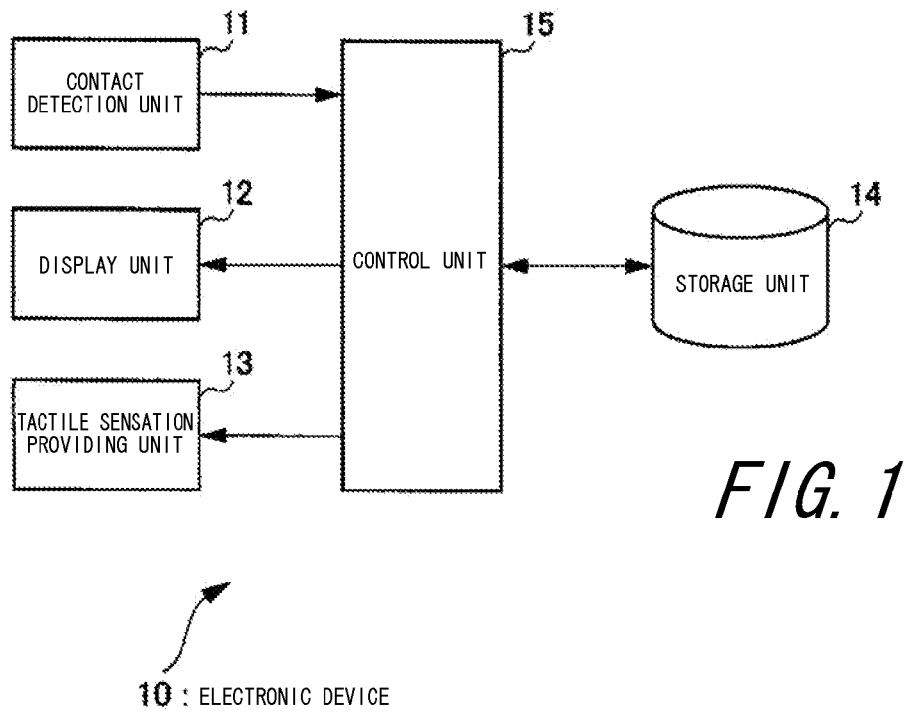
FIG. 1 is a block diagram illustrating a configuration of an electronic device according to an embodiment.

FIG. 1 is a block diagram illustrating a configuration of an electronic device according to the present embodiment. As illustrated in FIG. 1, an electronic device 10 according to the present embodiment includes a contact detection unit 11, a display unit 12, a tactile sensation providing unit 13, a storage unit 14 and a control unit 15.

The contact detection unit 11 is normally disposed on a front face of the display unit 12 and, on an input face of the contact detection unit 11, detects a contact to and release from objects such as characters displayed on the display unit 12 by a contact object such as a user's finger or a stylus pen. Also, the contact detection unit 11 detects a contact position on the input face and outputs the detected contact position to the control unit 15.

In order to detect the contact position, the contact detection unit 11 is constituted by using, for example, a known type such as a resistive film type, a capacitive type, an optical type or the like. When the contact detection unit 11 is of the optical type, since the contact detection unit 11 detects a position where infrared rays are blocked by the contact object, the contact detection unit 11 does not need a physical contact of the contact object in order to detect a contact. That is, the contact detection unit 11 may also detect a contact other than the physical contact.

The display unit 12 displays graphical images of the objects such as the characters. The display unit 12 may be constituted by using, for example, a liquid crystal display (LCD) or an organic electroluminescence display (OELD).

The contact detection unit 11 and the display unit 12 may be integrally formed. Such a device having both functions of the contact detection unit 11 and the display unit 12 may have a configuration in which a plurality of photoelectric conversion elements such as photodiodes are orderly mixed in a group of pixel electrodes arranged in a matrix pattern in the liquid crystal panel. This integrated device may display the image in a structure of the liquid crystal panel and also detect the contact position by nearby photoelectric conversion elements receiving backlight of the liquid crystal display reflected by a tip of a pen in contact with a desired position on the face of the panel.

The tactile sensation providing unit 13, by using a vibration motor (an eccentric motor) or the like, for example, indirectly vibrates the input face of the contact detection unit 11 such that the tactile sensation is provided to the contact object such as an operator's finger or the like in contact with the input face. Alternatively, a piezoelectric element may be disposed on the input face such that the input face is directly vibrated. The tactile sensation providing unit 13 may provide the tactile sensation to the contact object also by controlling an electrical charge of a film put on the input face of the contact detection unit 11, without mechanical vibration.

However, when the tactile sensation providing unit 13 is constituted by using the eccentric motor and the input face is indirectly vibrated, the whole electronic device is vibrated. Therefore, when the electronic device is placed on a desk or the like and the eccentric motor vibrates, the vibration is transmitted to the desk and may be noticed by people around an operator. On the other hand, when the tactile sensation providing unit 13 is constituted by using the piezoelectric element and the input face is directly vibrated, the whole electronic device is not vibrated (or even if the whole electronic device is vibrated, a magnitude of the vibration is smaller than that when the tactile sensation providing unit 13 is constituted by using the eccentric motor). Therefore, a risk that the vibration of the input face is noticed by people around the operator may be reduced.

According to the present embodiment, two vibration patterns of a tactile sensation A and a tactile sensation B are prepared for the contact object. The tactile sensation A is in a vibration pattern for indicating that the operator has contacted turned characters displayed on the display unit 12, and the tactile sensation B is in a vibration pattern associated with characters corresponding to the turned characters. When the character is a number, the tactile sensation B is provided the number of times. When the character is a letter, the tactile sensation B may be converted into a Morse signal or the like. These vibration patters are stored in a predetermined area of the storage unit 14 described below.

The storage unit 14 may be constituted by using a semiconductor memory or the like and stores various information and programs for operating the electronic device 10, as well as functioning as a work memory. According to the present embodiment, the storage unit 14 stores, for example, preset authentication information including five characters and the two vibration patterns of the tactile sensation A and the tactile sensation B.

The control unit 15 has a function to control such that predetermined characters are turned and displayed on the display unit 12. The control unit 15 also has a function to control the tactile sensation providing unit 13, when the contact detection unit 11 detects a contact at a position corresponding to the turned characters displayed on the display unit 12, such that a tactile sensation associated with the characters corresponding to the turned characters is provided to the contact object. The control unit 15 may be constituted by using a microprocessor, for example. In this case, the microprocessor realizes the above functions by sequentially retrieving the programs stored in a program area of the storage unit 14 and executing the programs.

(Operation of the Embodiment)

Figure 2:
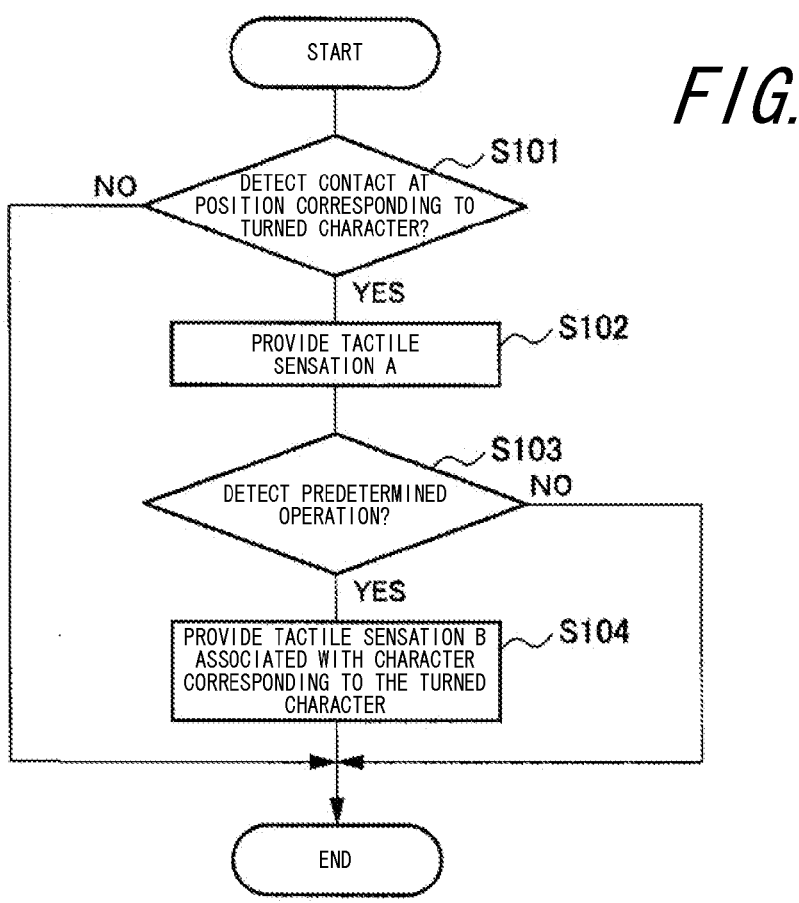
FIG. 2 is a flowchart illustrating an operation of the electronic device according to the embodiment.

FIG. 2 is a flowchart illustrating an operation of the electronic device 10 according to the present embodiment and FIG. 3 is a diagram schematically illustrating the operation launched on a display panel. The operation of the electronic device 10 according to the present embodiment will be described in detail with reference to FIG. 2 and FIG. 3.

It is assumed that the turned characters represented by five symbols "*" are displayed on the display unit 12 as illustrated in FIG. 3(a), for example. As illustrated in FIG. 2, when the control unit 15 first detects the contact by the operator at the position corresponding to the turned characters (YES at step S101), the control unit 15 controls the tactile sensation providing unit 13 to provide the tactile sensation A. Here, the tactile sensation A is of the vibration pattern for notifying the operator of the contact to the turned characters. FIG. 3(b) illustrates that the electronic device 10 provides the tactile sensation A when the operator contacts the turned characters displayed on the display unit 12.

Subsequently, when the control unit 15 detects a predetermined operation such as multi-touch or the like by the operator to the position corresponding to the turned characters displayed on the display unit 12 (YES at step S103), the control unit 15 controls the tactile sensation providing unit 13 to provide the tactile sensation B associated with the characters corresponding to the turned characters (step S104). Here, the tactile sensation B is of the vibration pattern prepared for each character and stored in the storage unit 14. The control unit 15 retrieves the vibration patterns corresponding to recognized characters from the storage unit 14 and outputs the Morse signals or the like, for example, corresponding to the recognized characters. FIG. 3(c) illustrates that the electronic device 10 provides the tactile sensation B when the operator performs the multi-touch to the turned characters displayed on the display unit 12.

When the contact to the position corresponding to the turned characters displayed on the display unit 12 is not detected at step S101 (NO at step S101), or when the predetermined operation is not detected at step S104 (NO at step S103), the control unit 15 ends the operation.

According to the electronic device 10 of the present embodiment, as described above, the control unit 15 controls the tactile sensation providing unit 13, when the contact detection unit 11 detects the contact at the position corresponding to the turned characters displayed on the display unit 12, such that the tactile sensation associated with the characters corresponding to the turned characters (tactile sensation B) is provided to the contact object. Thereby, when the operator contacts the turned characters, the tactile sensations corresponding to the turned characters are provided. Accordingly, the operator may confirm the authentication information without being noticed by people around the operator. Since the operator may confirm the authentication information, improved convenience is offered and erroneous inputs by the operator may be reduced. For example, a burden imposed on the operator by lockout and the like due to a multiple authentication failure may be reduced.

The electronic device 10 according to the present embodiment is applicable not only for the authentication information but also for notification of personal information such as an address book. Also, the electronic device 10 according to the present embodiment is applicable not only for recognition of the information described above by the control unit 15 but also for confirmation of the characters corresponding to the turned characters on a browser.

Although a preferred embodiment is described above, it is to be understood that the scope of the present invention is not limited thereto. It will be understood by a person who is skilled in the art that the above embodiment may be changed or altered in a variety of manners. Such changes and alterations are also included in the scope of the present invention, as is clear from the Claims attached hereto.

According to an embodiment, when the vibration motor (eccentric motor) is disposed in a body of the electronic device and, simultaneously, the piezoelectric element is disposed on the input face, the control unit may control the piezoelectric element such that the tactile sensations associated with the characters corresponding to the turned characters are provided to the contact object. When the control unit controls the piezoelectric element, instead of the vibration motor (eccentric motor), such that the tactile sensation associated with the characters corresponding to the turned characters is provided to the contact object as described above, the whole electronic device is not vibrated. Therefore, when the operator operates the electronic device placed on the desk or the like, the vibration is not transmitted to the desk. As a result, the risk that the vibration is noticed by people around the operator may be reduced.

According to another embodiment, when vibration noise is generated in providing the tactile sensation associated with the characters corresponding to the turned characters, the characters corresponding to the turned characters may possibly be identified by people around the operator. For example, when the vibration noise is generated three times in providing the tactile sensation associated with the characters corresponding to the turned characters, people around the operator, hearing the three vibration noises, may notice that a character associated with "3" is used for the authentication information. According to the present embodiment, therefore, it is preferable to reduce the vibration noise generated when the tactile sensation associated with the characters corresponding to the turned characters is provided to the contact object. However, when the vibration noises for all vibrations of the tactile sensation providing unit are uniformly reduced, a problem may occur in providing a tactile sensation as a vibrating alert in a silent mode and the like which the operator should feel unfailingly.

According to the present embodiment, therefore, a magnitude of the vibration of the tactile sensation providing unit for providing the tactile sensation when the contact detection unit detects the contact at the position corresponding to the turned characters displayed on the display unit may be set to be smaller than the magnitude of the vibration of the tactile sensation for other operations. Here, "other operations" may include, for example, providing the tactile sensation as the vibrating alert in the silent mode as described above. According to the present embodiment, in order to control the magnitude of the vibration of the tactile sensation providing unit for proving the tactile sensation, vibration amplitude of a drive signal for driving the tactile sensation providing unit may be controlled.

According to the present embodiment, the tactile sensation A is provided when the contact at the position corresponding to the turned character is detected and then the tactile sensation B associated with the character corresponding to the turned character is provided when the predetermined operation is detected. According to the present embodiment, at this time, the magnitude of the vibration of the tactile sensation providing unit for providing the tactile sensation B associated with the character corresponding to the turned character may be smaller than the magnitude of the vibration of the tactile sensation providing unit for providing the tactile sensation A.

According to the present embodiment, further, when the tactile sensation associated with the character corresponding to the turned character is provided, an alphabet may be represented by a vibration pattern according to an input method of a mobile phone (numerical keypad). For example, in order to display "e" by the input method of the mobile phone (numerical keypad), a key of "3" is pressed down twice. Therefore, when the character corresponding to the turned character is "e", the electronic device may provide the contact object with the tactile sensation in a vibration pattern having three vibrations, a pause and then two vibrations.

What is claimed is:

1. An electronic device comprising:
   a display configured to display characters;
   a contact detector configured to detect a contact;
   a tactile sensation provider configured to provide a tactile sensation to an object contacting the contact detector; and
   a controller configured to control the display such that a plurality of predetermined characters entered by an operator are displayed as a corresponding plurality of respective turned characters on the display such that a person viewing the plurality of respective turned characters on the display is unable to read the plurality of predetermined characters corresponding to the plurality of respective turned characters, wherein
   the controller, when the contact detector detects the contact by the object at a position corresponding to one of the plurality of respective turned characters displayed on the display, controls the tactile sensation provider such that a tactile sensation associated with a one of the plurality of predetermined characters that has been inputted by the operator and corresponding to the one of the respective turned characters is provided to the object, and wherein when the contact detector detects the contact by the object at a position not corresponding to one of the plurality of respective turned characters displayed on the display, controls the tactile sensation provider such that the tactile sensation associated with the one of the plurality of predetermined characters that has been inputted by the operator is not provided to the object.

2. The electronic device according to claim 1, wherein the controller controls such that a magnitude of the tactile sensation provider for providing the tactile sensation when the contact detector detects the contact at the position corresponding to the one of the plurality of respective turned characters displayed on the display is smaller than the magnitudes of vibrations of the tactile sensation provider for providing the tactile sensation for other operations.

* * * * *